United States Patent [19]

Hendrix

[11] 4,373,740
[45] Feb. 15, 1983

[54] THREE-WHEEL VEHICLE

[76] Inventor: Willie J. Hendrix, 23 W. Broadway, Central Nyack, N.Y. 10960

[21] Appl. No.: 202,623

[22] Filed: Oct. 31, 1980

[51] Int. Cl.³ .......................... B60K 5/06; B60K 5/08
[52] U.S. Cl. .......................... 280/269; 280/281 LP; 280/282
[58] Field of Search ............ 280/282, 269, 268, 267, 280/281 LP, 257

[56] References Cited

U.S. PATENT DOCUMENTS

| 2,481,683 | 9/1949 | Polacek | 280/282 |
| 2,789,831 | 4/1957 | Verik | 280/257 |
| 3,082,863 | 3/1963 | Oharenko | 224/275 |
| 3,429,584 | 2/1969 | Hendricks | 280/282 |
| 3,913,929 | 10/1975 | Matsuura | 280/282 |
| 3,921,467 | 11/1975 | Matsuura | 280/282 |
| 3,922,005 | 11/1975 | Bundschuh | 280/282 |

*Primary Examiner*—John A. Pekar
*Attorney, Agent, or Firm*—Quaintance & Murphy

[57] ABSTRACT

A three-wheel velocipede includes a relatively stiff frame having a base portion with converging and diverging side rails for supporting wheels and a seat and a superstructure of triangular components. A pedal crank for powering the velocipede is positioned on the superstructure in front of the seat at a height approximately the height of the seat. A back rest is provided so that a rider pushes against his back as he pedals. In addition, provision is made for pedaling the velocipede backwards so that it will move in reverse.

6 Claims, 9 Drawing Figures

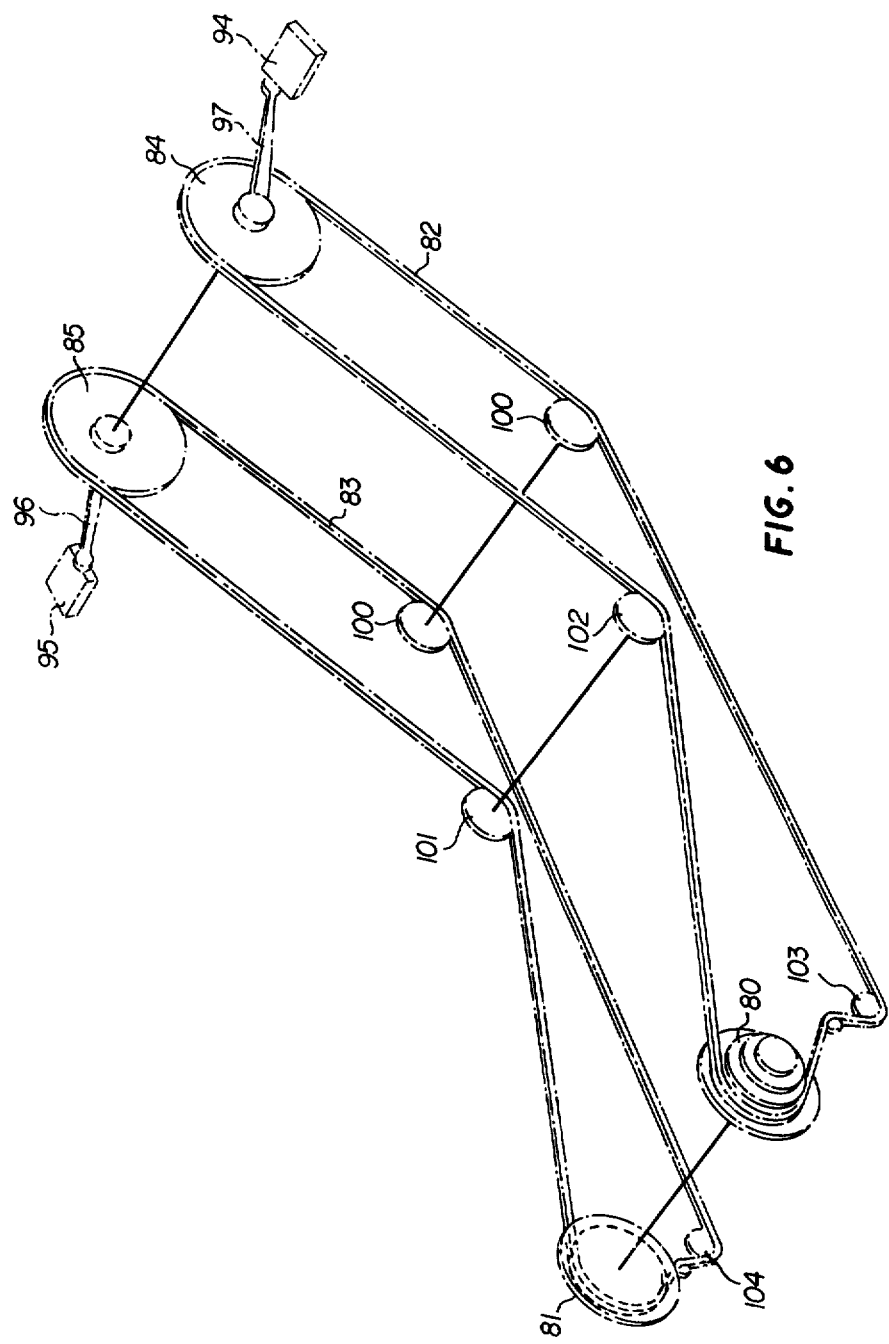

THREE-WHEEL VEHICLE

BACKGROUND OF THE INVENTION

1. Field of the Invention

The instant invention relates to three-wheel, pedaled vehicles, and more particularly, the instant invention relates to three-wheel, pedaled vehicles wherein the vehicles include a pair of front steerable wheels and a single, rear, driving wheel.

2. General Considerations in Prior Art

To date, there has been much experimentation on three-wheel, pedaled vehicles, or tricycles, as replacements for the now universally utilized two-wheel, pedaled vehicle, or bicycle. Bicycles have several drawbacks. Among these drawbacks are low-speed instability, high wind resistance, general discomfort, and an inability to reverse. Prior art approaches have attemped to solve these problems with bicycles, with perhaps the exception of providing a vehicle which can be conveniently pedaled backwards. However, prior art approaches result in vehicles which are extremely expensive and not generally suitable for use in automobile traffic.

U.S. Pat. Nos. 3,913,929 and 3,921,467 disclose three-wheel, manually-powered vehicles wherein a pair of front wheels are pivoted for steering and a single rear wheel is chain driven by pedals. In these patents, the pedals are elevated with respect to the rider. However, these patents do not disclose a frame structured to resist the complex bending moments applied by the rider. In addition, riders of these vehicles are positioned extremely close to the road and, therefore, have very low visibility in automobile traffic. Not only can riders not see around trucks and automobiles, but trucks and automobiles cannot see them. U.S. Pat. Nos. 2,789,831 and 3,429,584 also disclose pedal-operated, three-wheel vehicles with a pair of front wheels used for steering. In each case, steering columns are disclosed as well as rather standard seats with backrests. However, in these patents, the rider is positioned with his body erect, so as to present a large frontal area which increases wind resistance. Moreover, in each of these patents the rider cannot apply as much force against the pedals because the rider's back is not braced against the vehicles.

In none of these references is there disclosed a vehicle which can be pedaled in reverse. If a vehicle is to be parked and maneuvered among crowds of people and other vehicles, then it is important to have a vehicle which can be pedaled not only in reverse but at various speeds in reverse.

SUMMARY OF THE INVENTION

In view of the aforementioned considerations and other considerations, it is a feature of the instant invention to provide a new and improved three-wheel velocipede having a rear driving wheel and a pair of front steering wheels, wherein the velocipede has a relatively stiff frame, is comfortable, and can be pedaled in reverse with relative ease.

In view of this feature and other features, the instant invention contemplates a three-wheel velocipede which utilizes a frame comprising a base for supporting the wheels of the velocipede and a superstructure for supporting a crank, steering gear, and seat. The base has a pair of said rails which converge from the front end of the velocipede toward a middle section thereof, and thereafter diverge from the middle section to the rear end of the velocipede. The side rails form a fork for supporting the axle of the rear wheel between the rails and a space for spreading the front wheels laterally of the rear wheel to provide a stable vehicle which rolls on three points. A first bracing tube extends between the rails at the front end thereof, a second bracing tube extends between the tubes intermediate the front end and the middle section of the base, and a third bracing tube extends between the rails just forward of the rear wheel. The superstructure includes a V-shaped stanchion for supporting the crank wherein the stanchion has one leg connected to the second bar and the other leg to the middle section of the frame. A pair of U-shaped supports are provided for supporting the backrest of the seat wherein one leg is connected to the base adjacent the third brace and the other leg is connected to the rear end of the base. A second stanchion projects upwardly from the middle section of the base for journalling a steering column therein. Accordingly, a relatively rigid frame is provided which minimizes flex as the vehicle is pedaled.

The instant invention further contemplates a three-wheel velocipede which is reversible. Moreover, the instant invention contemplates a three-wheel velocipede in which the driver has a comfortable yet relatively low windage position when pedaling the vehicle.

BRIEF DESCRIPTION OF THE DRAWINGS

FIG. 6 is a perspective view of a double chain drive system in accordance with the instant invention.

DETAILED DESCRIPTION OF THE PREFERRED EMBODIMENT

Figure 1:
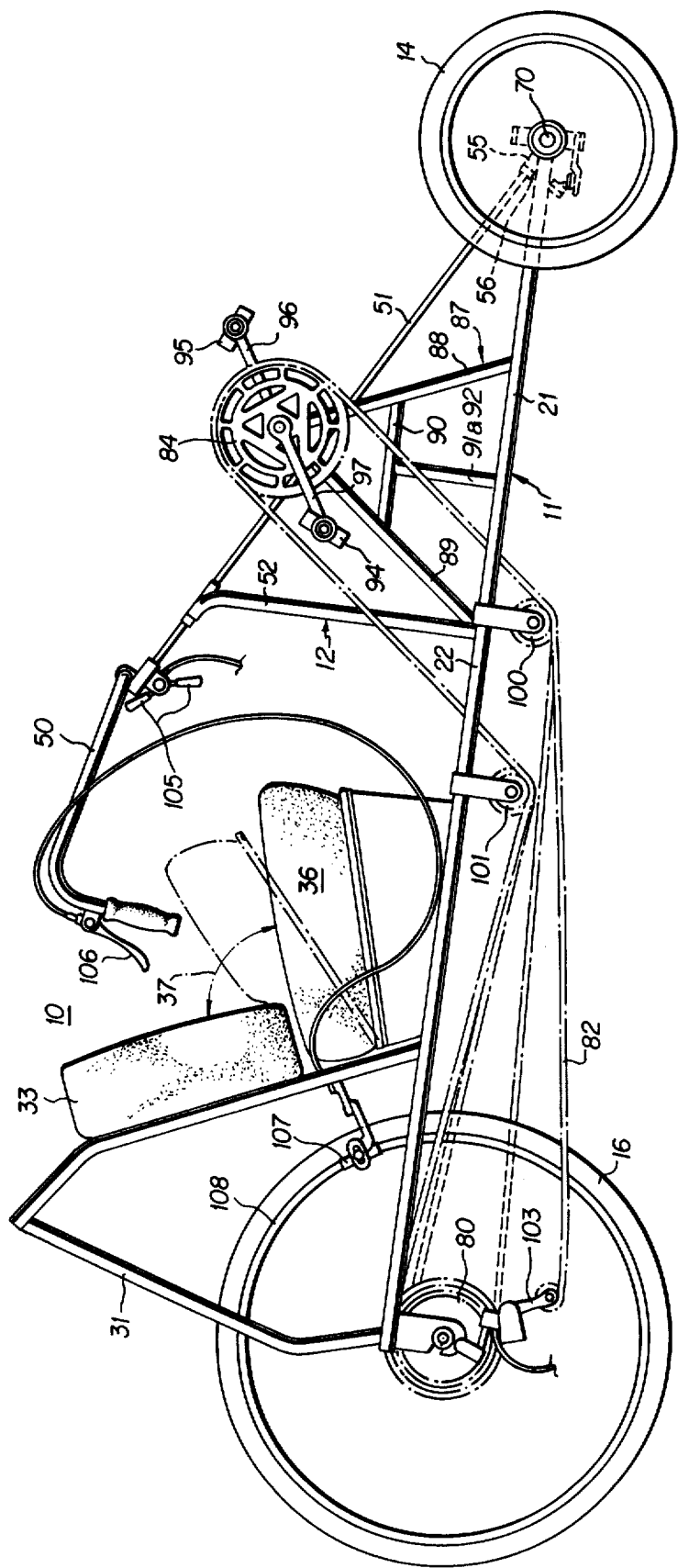
FIG. 1 is a side view of a vehicle in accordance with the instant invention.
Figure 2:
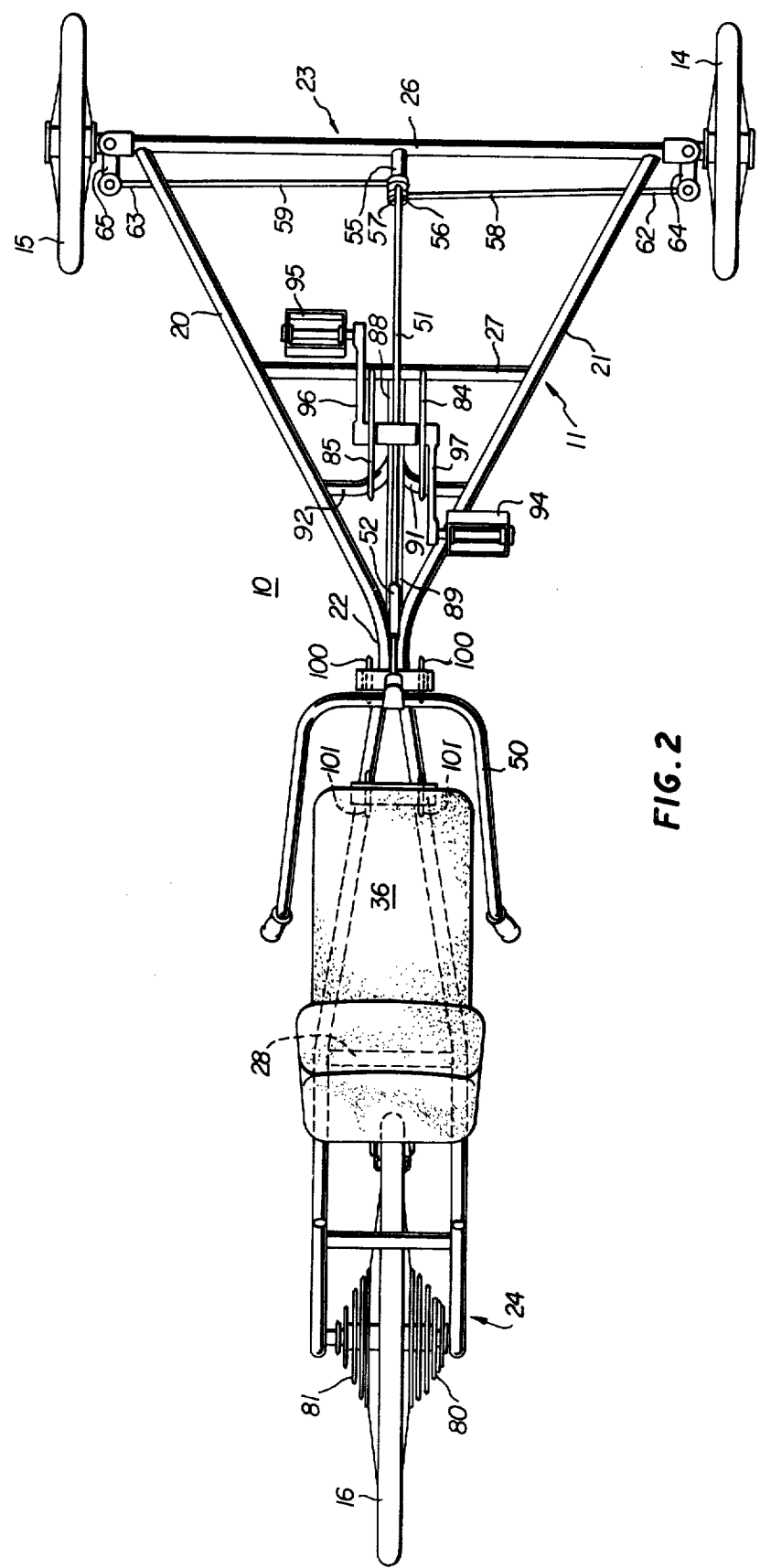
FIG. 2 is a top view of the Vehicle in FIG. 1.
Figure 3:
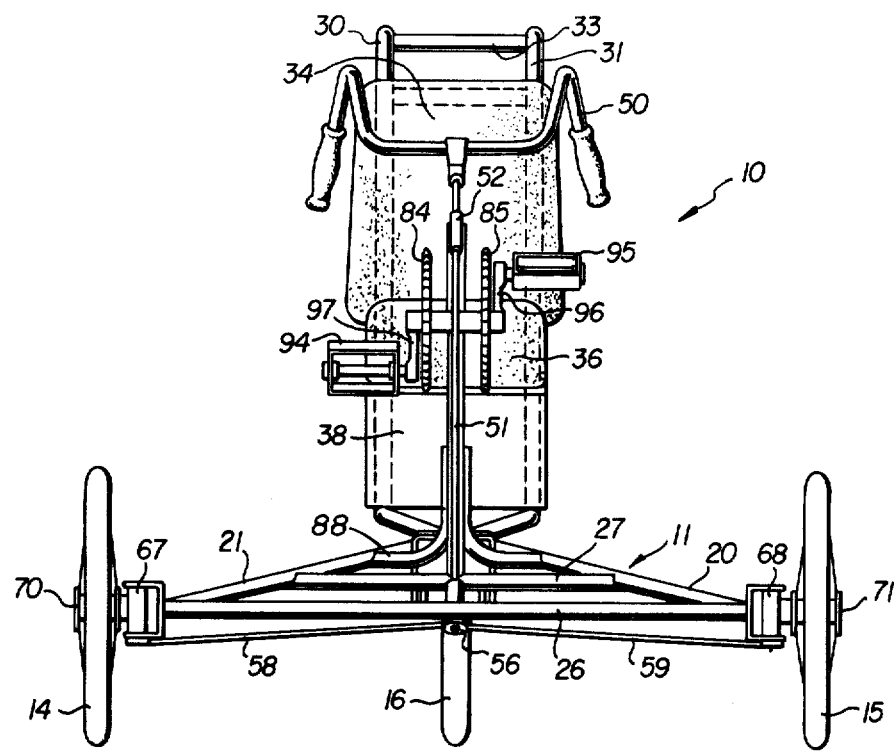
FIG. 3 is a front view of the vehicle of FIG. 1.
Figure 4:
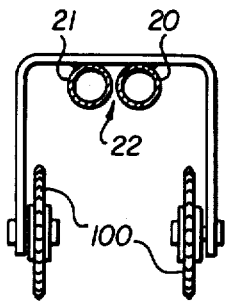
FIG. 4 is a front view of a first pair of chain sprockets.
Figure 5:
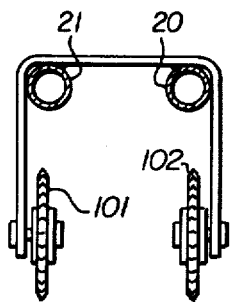
FIG. 5 is a front view of a second pair of chain sprockets.

Referring now to the drawings, there is shown a velocipede, designated generally by the numeral 10, which includes a base, designated generally by the numeral 11, and a superstructure, designated generally by the numeral 12. The base 11 of the velocipede 10 mounts front wheels 14 and 15 and a rear wheel 16. The super structure 12 provides the supports and structures for supporting the rider so that the rider can sit on the velocipede 10, steer the front wheels 14 and 15, and pedal to drive the rear wheel 16. The base 11 of the velocipede 10 comprises a pair of side rails 20 and 21 which diverge from a middle section 22 of the base 11 toward the front end of the velocipede 23 and also diverge at a lesser angle from the middle section 22 to the rear end 24 of the tricycle. A first brace 26 extends between the front ends of the side rails 20 and 21; a second brace 27 is positioned between the first brace 26 and middle section 22 of the frame 11; and a third brace 28 is positioned between the middle section 22 of the frame and the rear end 24 of the frame. These braces cooperate with triangular bracing used for the superstructure 12 and with the triangular arrangement of the wheels 14, 15, and 16 to provide a rigid frame.

The portion of the superstructure 12 which is used to support the rider comprises a pair of somewhat inverted U-shaped supports 30 and 31 which extend upwardly from the side rails 20 and 21 at a location adjacent the third brace 28, slope back and project downwardly to connect again with the side rails 20 and 21 at the rear end 24 of velocipede. The rear wheel 16 rotates between the supports 30 and 31. The supports 30 and 31 are stiffened by a brace 33 which extends therebetween. A seat back 34 is rigidly secured to the supports 31 and 32 and slants back at an angle with respect to a seat 36 which is secured on top of the rails 20 and 21. Preferably, the angle 37 between the seat 36 and seat back 33 is about 120° so that the rider assumes an inclined position. The seat 36 may include a container 38 for tools and the like, which container is accessed by lifting up the upper half of the seat.

The steering gear of the velocipede includes handle bars 50 which are supported on and turn a steering column 51. Steering column 51 is supported by a vertical strut 52 which is welded to and extends up from the middle section 22 of the base frame 11. The other end of the steering column 51 is mounted in a bearing 55 on the first or front brace 56 so as to rotate freely therein. Rigidly attached to the steering column 51 is a crank 56 which has a pin 57 mounted therein, which pin 57 has tie rods 58 and 59 journalled thereupon. The tie rods 58 and 59 are in turn journalled at their outer ends 62 and 63 to cranks 64 and 65 which are rigidly connected to vertical mounting spindles 67 and 68 to which spindle axles 70 and 71 for the front wheels 14 and 15 are rigidly attached. As the steering column 51 is rotated clockwise or counterclockwise, one of the rods 58 or 59 is pushed while the other is pulled, thus turning the wheels 14 and 15 with respect to the vertical mounting spindles 67 and 68.

The velocipede 10 is driven by rear wheel 16 which has a first set of sprockets 80 on one side for moving the velocipede 10 forward and a second set of sprockets 81 on the opposite side for reversing direction of the velocipede. The sprockets 80 and 81 are connected by chains 82 and 83, respectively, to a pair of driving sprockets 84 and 85 which are supported on an inverted V-shaped stanchion 87 above the base frame 11. The inverted V-shaped stanchion 87 has a first tube 88 which extends from the second brace 27 to a bearing which supports the sprockets 84 and 85, and a second tube 89 which extends rearwardly to the bottom of steering column support 52. Between the tubes 88 and 89 is a cross-brace 90, which cross-brace is supported by a pair of curved vertical braces 91 and 92 that are welded to the side rails 20 and 21. Accordingly, a rigid structure is provided for supporting the driving sprockets 84 and 85. The driving sprockets 84 and 85 are driven by a pair of pedals 94 and 95 connected thereto by crank arms 96 and 97, respectively, so that the sprockets 84 and 85 are driven in a manner similar to the conventional bicycle. The chains 82 and 83 are passed under a first set of idler sprockets 100 and a second set of idler sprockets 101 so as to pass beneath the seat 36.

Figure 7A:
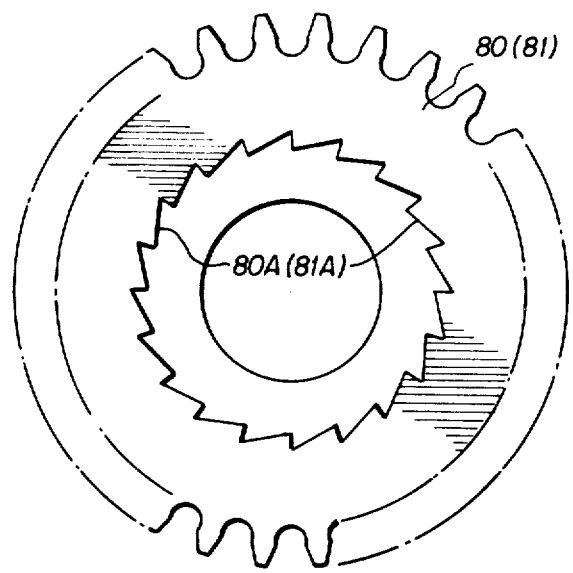
FIGS. 7a, 7b and 7c are views of a rear sprocket with a reversing ratchet arrangement.
Figure 7B:
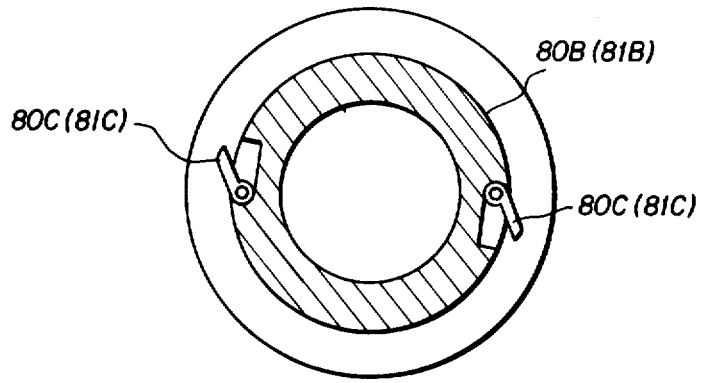
Figure 7C:
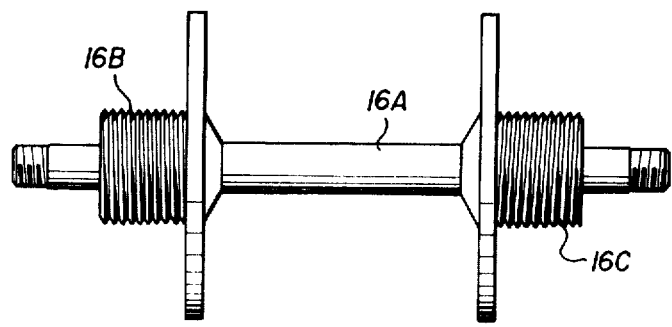

As can be seen from FIG. 7, the wheel 16 is driven in one direction by the gear set 80 to move the velocipede forward, and a identical set of gears to 80, are mounted on the left to move the velocipede backwards. Each gear set is coupled to the hub of the rear wheel 16 by a ratchet which idles in one direction of rotation and engages the sprocket in the other direction of rotation. The reverse gears 81 are simply mounted in the reverse direction, so that while the velocipede 10 is being propelled forward, the reverse gears idle because the ratchet does not engage, and while the velocipede is being pedalled backwards the forward gears 80 idle because the ratchet does not engage with the forward gears. In this way the velocipede 10 has the flexibility of going in both directions which is an advantage with a tricycle but of no necessary advantage with a bicycle, since it is difficult for most people to pedal a bicycle backwards without falling from the bicycle.

More specifically, the rear wheel 16 is attached by spokes to a hub 16A. The hub 16A has oppositely threaded spindle 16B and 16C on each side thereof. Spindle 16B receives the sprockets 80 for moving the vehicle forward, while the spindle 16C receives the sprockets 81 which move the vehicle in the rearward direction. Inside of the sprockets 80 and 81 there are ratchet teeth 80A and 81A. The ratchet teeth 80A and 81A are identical and face in the same directions. Concentric with the ratchet teeth 80A and 81A are male ratchet parts 80B and 81B, which have spring projected fingers that engage the ratchets 80A and 81A, depending on whether one of the sprockets 80 is being rotated or one of the sprockets 81 is being rotated.

Both the forward sprockets 80 and reverse sprockets 81 can be individually selected by conventional derailleur mechanisms 103 and 104. The derailleur mechanisms 103 and 104 are operated by a single set of levers 105 which utilize a pair of cables, which goes to the derailleur 102.

In order to stop the vehicle, a conventional hand brake 106 is used which, when squeezed, urges brake shoes 107 against the rim 108 of the rear wheel 16.

One constructed embodiment of the velocipede 10 in accordance with the instant invention is seven feet, two inches in length with the front wheels 14 and 15 being spaced thirty-six inches apart. The frame is constructed of chrome tubular piping, which is one inch to one and one-eighth inch in diameter. The rear wheel 16 is twenty-seven inches in diameter, while the two front wheels 14 and 15 are sixteen inches in diameter. The front brace 27 is approximately twenty-eight inches in length.

The cranks are positioned above and behind the front wheels and are elevated twenty-four inches from ground level and twenty-four inches from the axes of the front wheels 14 and 15. The chains 82 and 83 extend upward at an angle between 45° and 60°, and pairs of three and one-quarter inch sprockets are used for the sprockets 100 and 101.

In order to allow clearance for the rider's knees, the handle bar 50 is a "banana" handlebar.

By utilizing the aformentioned design, where the rider's legs pump outwardly and forwardly against the pressure of the seat back 34, the rider can achieve more thrust with greater comfort than the conventional bicycle in which the rider assumes a "question-mark" posture. There is less wind resistance with the disclosed arrangement, because the rider's legs extend generally in the direction of the air stream rather than across the air stream. Moreover, since the rider is tilted back, the rider's body presents less wind resistance. In the illustrated embodiment, the rider is at a rather conventional chair height with respect to the road, so that vehicle is easy to sit on. In addition, the rider is at a level substantially similar to the level of an automobile driver or passenger, so that the vehicle has good visibility in traffic both for seeing and being seen.

The aforedescribed embodiment and example are merely illustrative of the invention which is to be limited only by the following claims:

What is claimed is:

1. A three-wheel velocipede with a rear driving wheel driven by a sprocket and a pair of front steering wheels, the velocipede comprising:

a frame having a base for supporting the wheels and a superstructure for supporting a crank with a sprocket for driving a chain which is trained around the rear wheel sprocket, steering gear with a steering column, and a seat with a back rest, the seat resting on top of the base; said base having a pair of side rails which converge from the front end of the velocipede toward a middle section thereof and diverge from the middle section to the rear end of the vehicle, said side rails forming a fork for supporting the axle of the rear wheel between the rails, said base further including a plurality of bracing tubes a first of which extends between the side rails at the front end thereof, a second of which extends between the side rails intermediate the front end and middle section, and a third which extends between the side rails just forward of the rear wheel;

said superstructure including a single, inverted, V-shaped stanchion for supporting the crank, the stanchion having one leg connected to the second tube and the other leg to the middle section of the frame; a pair of inverted U-shaped supports for supporting the back rest of the seat each support having one leg connected to the frame adjacent the third brace and the other leg connected at the rear end of the base; and a second stanchion projecting upwardly from the middle section of the base for journaling the steering column therein.

2. The three-wheel velocipede of claim 1 wherein the inverted V-shaped stanchion for supporting the crank positions the crank substantially level with the top of the seat whereby the rider pushes his back against the seat as he pedals.

3. The three-wheel velocipede of claim 2 wherein reverse means are provided for pedaling the velocipede backwards.

4. The three-wheel velocipede of claim 3 wherein the reverse means includes an additional sprocket driven by said crank, an additional sprocket attached to the rear wheel, and an additional chain for driving the rear wheel.

5. The velocipede of claim 1, 2, 3 or 4 wherein the seat includes a compartment therein for storage.

6. The three-wheel velocipede of claim 1 wherein the steering column is journaled through the V-shaped stanchion which supports the crank.

* * * * *